O. C. ROOS.
SPACE TELEGRAPHY.
APPLICATION FILED JUNE 10, 1907.

901,649.

Patented Oct. 20, 1908.
8 SHEETS—SHEET 1.

WITNESSES:
E. B. Tomlinson.
Patrick J. Conroy.

INVENTOR.
Oscar C. Roos
by Browne & Woodworth
attys.

O. C. ROOS.
SPACE TELEGRAPHY.
APPLICATION FILED JUNE 10, 1907.

901,649.

Patented Oct. 20, 1908.

UNITED STATES PATENT OFFICE.

OSCAR C. ROOS, OF NEWTON, MASSACHUSETTS, ASSIGNOR TO STONE TELEGRAPH AND TELEPHONE COMPANY, OF BOSTON, MASSACHUSETTS, A CORPORATION OF MAINE.

SPACE TELEGRAPHY.

No. 901,649.　　　Specification of Letters Patent.　　　Patented Oct. 20, 1908.

Application filed June 10, 1907. Serial No. 378,093.

*To all whom it may concern:*

Be it known that I, OSCAR C. ROOS, a citizen of the United States, and a resident of Newton, in the county of Middlesex and State of Massachusetts, have invented a new and useful Improvement in Space Telegraphy, of which the following is a specification.

My invention relates to apparatus for simultaneously transmitting and receiving space telegraph signals.

The object of my invention is to provide a duplex space telegraph system in which the transmitting and receiving apparatus are permanently connected with the antenna or elevated conductor and are constructed and arranged to be operated simultaneously without mutual interference.

My invention may best be understood by having reference to the drawings which accompany and form a part of this specification and which represent in diagram several arrangements of apparatus and circuits embodying the principles of said invention; but it will be understood that I do not limit myself to the particular systems therein shown, inasmuch as the latter are subject to a wide range of variation without departing from said principles.

In the drawings Figures 1, 1$^a$ and 2 are diagrams hereinafter referred to for the purpose of explaining certain features of my invention.

In Figs. 3 to 9, inclusive, C is a symbol employed to represent capacity and L is a symbol employed to represent inductance. The various capacities and inductances shown in said figures are differentiated by the use of subscripts and exponents while in Figs. 6 to 9, inclusive, they are further differentiated by the use of prefixes.

In each of the systems hereinafter described, the essential features are an elevated conductor connected in series with a parallel-branch circuit containing capacity and inductance in each of its branches, a resonant receiving circuit associated with both branches of said parallel-branch circuit, and an oscillation producing circuit associated with said elevated conductor. An earth connector constructed to have practically zero reactance for the fundamental frequency of the elevated conductor may be connected in series with the latter and in parallel with the parallel-branch circuit.

My invention resides in the proportionment of the electromagnetic constants of the several elements above referred to whereby the transmitting and receiving apparatus may be simultaneously employed without mutual interference.

Figures 1, 1A:
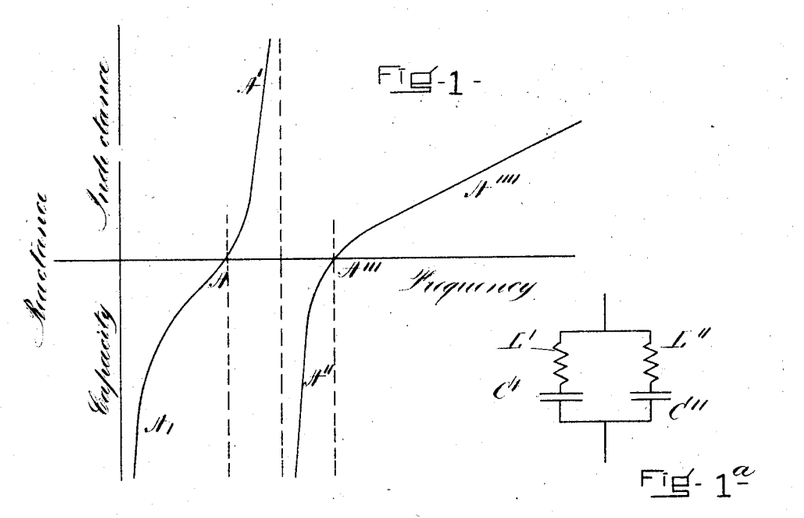
Figure 2:
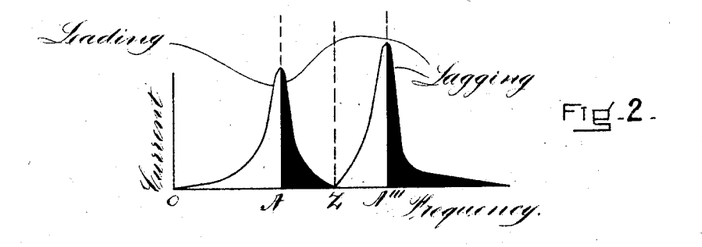

Referring to Figs. 1, 1$^a$ and 2, it has been demonstrated that the variation with frequency for persistent electrical oscillations of the reactance of a parallel-branch circuit of the type shown in Fig. 1$^a$ having an inductance $L'$ and a condenser $C'$ in one branch and an inductance $L''$ and a condenser $C''$ in the other branch, follows the law graphically represented in Fig. 1. As shown in Fig. 1, which is a curve drawn to rectangular coördinates, the ordinates representing reactance and the abscissæ representing frequency, the reactance of the parallel-branch circuit is zero for two frequencies A and A''', is negative between zero and A and between Z and A''', and is positive between A and Z and for frequencies higher than A'''. Accordingly that portion of the curve designated by A$^1$ represents a capacity reactance and, that portion thereof marked A' represents an inductance reactance, while those portions indicated by A'' and A'''' respectively represent inductance and capacity reactances. Fig. 2 is a curve likewise drawn to rectangular coördinates, the abscissæ as in Fig. 1 representing frequency and the ordinates representing current amplitude. Fig. 2 represents the variation with frequency of the current developed in a circuit of the type shown in Fig. 1$^a$ when acted upon by presistent electrical forces.

It will be noted that for a particular frequency designated at Z, the ordinate of the current-frequency curve is practically zero and that on either side of Z the curves are somewhat similar in shape. Accordingly it will be obvious that the constants of the two branches of the parallel-branch circuit may be so chosen that currents equal in amplitude and in phase, or equal in amplitude and opposite in phase, may be developed in said branches by an electromotive force of predetermined frequency.

Referring to Fig. 1, $C'a\ L'a$ represents an elevated conductor, $L'a$ being the secondary of an oscillation transformer the primary of which may form a portion of an oscillation-producing circuit of the type commonly employed in space telegraphy. The parallel-branch circuit consists of the branches $L'b$ $C'b$ and $L'b'$ $C'b'$. The resonant receiving circuit which may be associated in any of the usual ways with both branches of said parallel-branch circuit is designated by $L'c$ $C'c$. The earth connector which is connected in series with the elevated conductor and in parallel with the parallel-branch circuit is shown at $L'd$ $C'd$.

It will be noted that the parallel-branch circuit above referred to is of the type shown in Fig. 1$^a$ and that the variation with frequency of the reactance thereof and the current therein may be graphically represented by curves of the type shown in Figs. 1 and 2. For more complete explanation of the derivation of said curves reference may be made to the patent to Stone 884,109, dated April 7, 1908, in Fig. 4 of which the curve (6) corresponds to the curve shown in Fig. 1 of this application.

The function of the earth connector $L'd$ $C'd$ had been fully set forth in the patent to Stone 884,107, dated April 7, 1908, and briefly stated is as follows: The earth connector is attuned to the fundamental frequency of the elevated conductor, that is to say, each, when isolated, has zero reactance for the oscillations of the lowest frequency natural to the elevated conductor, and therefore for oscillations of said frequency the reactance of the system consisting of said elevated conductor and earth connector is zero. This being the case the reaction of the parallel branch circuit on the elevated conductor system consisting of said elevated conductor in series with said earth connector is practically zero for oscillations having a frequency equal to the fundamental of said elevated conductor. If therefore the oscillations developed by the oscillation-producing circuit or transmitting apparatus be equal in frequency to that natural to the elevated conductor, a practically infinite impedance will be opposed to such oscillations by the parallel-branch circuit, while the impedance of the earth connector for such oscillations will be practically zero.

While I prefer to employ the earth connector in each of the systems herein described, it will nevertheless be obvious that the same may be dispensed with, especially when the frequency to which the resonant receiving circuit is attuned is widely different from that of the oscillations developed by the oscillation-producing apparatus.

Figure 3:
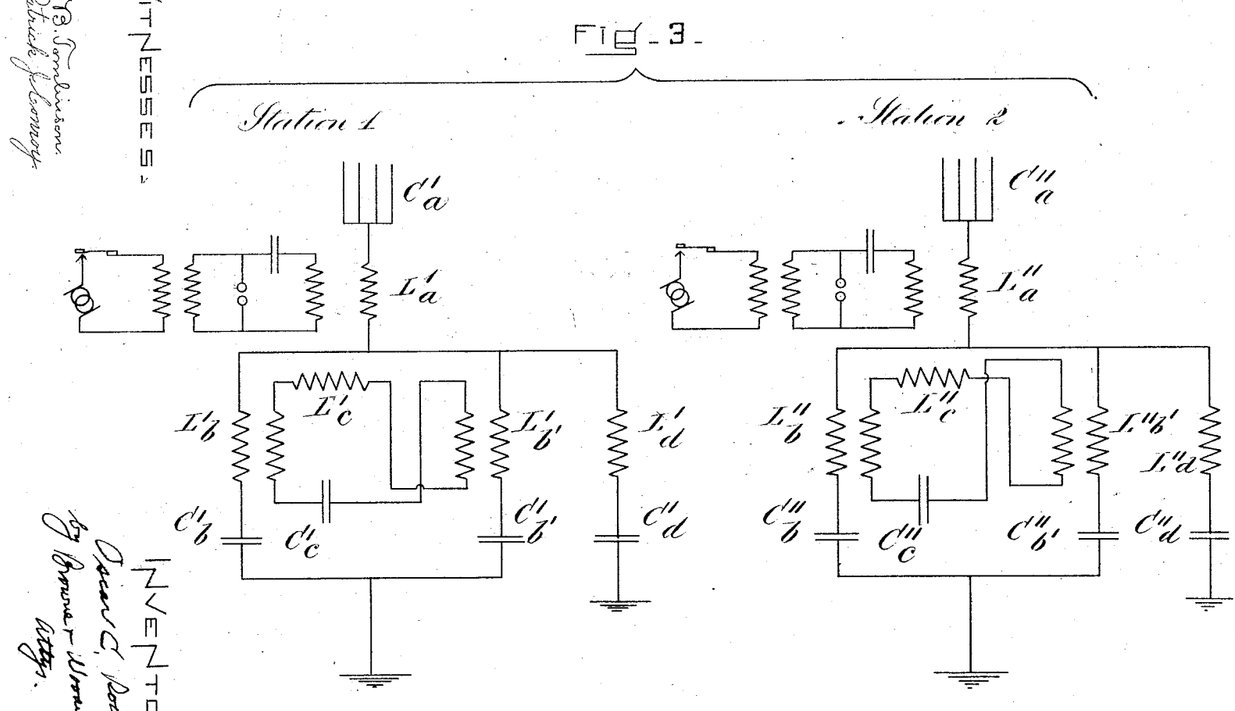
Figs. 3, 4 and 5 represent duplex wireless telegraph systems.
Figure 4:
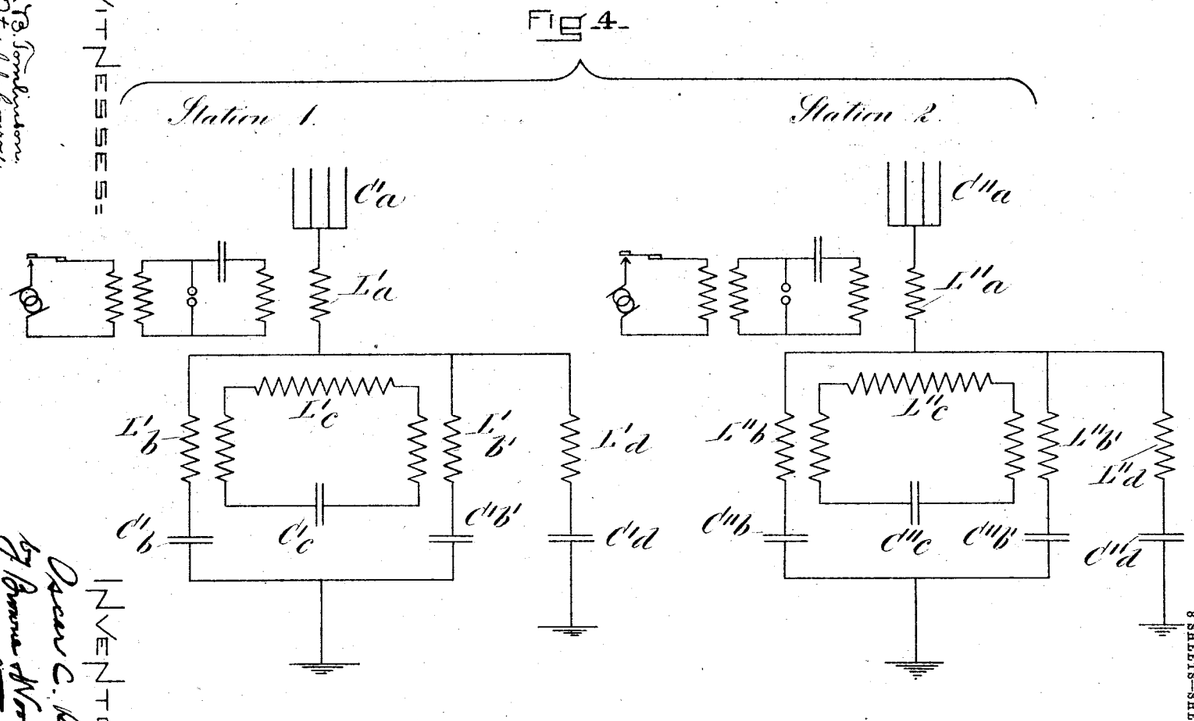

When the frequency of the currents developed in the elevated conductor system by the oscillation-producing circuit which is associated therewith is such that the reactance of both branches of the parallel-branch circuit is negative or that of both branches is positive, a resonant receiving circuit such as shown in Fig. 4 may be employed and the windings of both the secondaries which associate said resonant receiving circuit with the parallel-branch circuit may be the same in sense, and when said frequency is such that the reactance of one branch of said parallel-branch circuit is positive and that of the other is negative, the windings of said secondaries may be opposite in sense, as indicated in Fig. 3.

Figure 5:
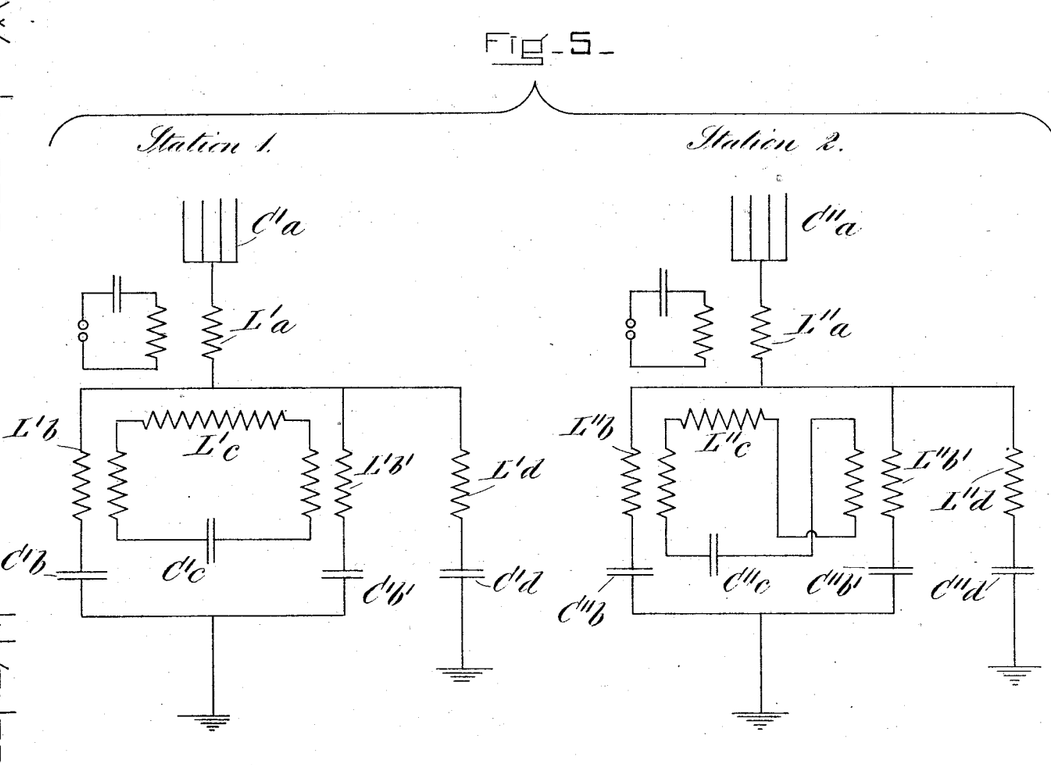

The following table is added herewith, not for the purpose of limiting my invention to the values therein set forth, but for the purpose of disclosing several specific arrangements of circuits which have been found in practice to be effective. In this table, "station 1" and "station 2" have reference to the stations shown in Figs. 3, 4 and 5, each station being a complete transmitting and receiving station, and the sole difference between the figures being that in Fig. 1 the secondaries in the resonant receiving circuits are differentially connected (this of course being equivalent to the direct connection of two secondaries oppositely wound), in Fig. 4 the said secondaries are both wound in the same direction and are directly connected, and in Fig. 5 the secondaries of the resonant receiving circuit at station 1 are directly connected and those at station 2 are differentially connected. The symbols $n't$, $n'b$, $n'b'$ and $n'r$ employed in said table indicate the frequencies to which various elements of the system are attuned, as follows: $n't$, the transmitting frequency, is that to which the elevated conductor system consisting of the elevated conductor $C'a$ $L'a$ and the earth connector $L'd$ $C'd$ is attuned and consequently is the frequency of the oscillations produced by the oscillation circuit inductively associated with the coil $L'a$. $n'b$ is the frequency to which the branch circuit $L'b$ $C'b$ is attuned and $n'b'$ is the frequency to which the branch $L'b'$ $C'b'$ is attuned. $n'r$, the receiving frequency, is that to which the resonant receiving circuit $L'c$ $C'c$ is attuned. In like manner the symbols $n''t$ $n''b$ $n''b'$ and $n''r$ represent the frequencies to which the several elements of station 2 are attuned, $n''t$ being that of the elevated conductor and earth connector, $n''b$ that of the branch $L''b$ $C''b$, $n''b'$ that of the branch $L''b'$ $C''b'$, and $n''r$ that of the resonant receiving circuit $L''c$ $C''c$. The numerals in the columns headed by the above mentioned symbols represent the wave lengths in meters corresponding to the frequencies in question. Thus "800" in column $n't$ and line "A" indicates that the elevated conductor system in station 1 is attuned to a frequency which corresponds to a wave length of 800 meters. Case A gives the constants for circuits arranged as shown in Fig. 3, case B those for circuits arranged as shown in Fig. 4, and cases C and D those for circuits arranged as shown in Fig. 5. It will be noted in each case that the transmitting frequency of station 1 is equal to the receiving frequency of station 2, and conversely:—

| Case. | Station 1. | | | | Station 2. | | | |
|---|---|---|---|---|---|---|---|---|
| | $n't$ | $n'b$ | $n'b'$ | $n'r$ | $n''t$ | $n''b$ | $n''b'$ | $n''r$ |
| A | 800 | 760 | 840 | 300 | 300 | 280 | 320 | 800 |
| B | 300 | 760 | 840 | 800 | 800 | 280 | 320 | 300 |
| C | 300 | 760 | 840 | 800 | 800 | 760 | 840 | 300 |
| D | 800 | 760 | 840 | 300 | 300 | 760 | 840 | 800 |

When the several circuits are proportioned in accordance with the above table, or in numerous other ways that will readily occur to those skilled in the art, the currents developed in the elevated conductor system by the oscillation producing circuit associated therewith will produce no effect in the home resonant receiving circuit due to the fact that the currents in the two branches of the parallel-branch circuit are exceedingly minute because of the practically infinite impedance of said parallel-branch circuit for currents of the frequency produced by the oscillation producing circuit and due to the further fact that such currents as are developed in said parallel branch-circuit are neutralized in the resonant receiving circuit in the manner above set forth.

It will be readily apparent that the earth connector need not be employed, especially when the resonant receiving circuit is attuned to a frequency which is widely different from that of the oscillations developed by the home oscillation producing circuit; but when said earth connector is employed it affords further security to the resonant receiving circuit, because it provides a path to earth of practically zero impedance in shunt to the parallel-branch circuit when the elevated conductor system is energized by the oscillation producing circuit.

The oscillations developed in the elevated conductor system at station 1 produce electromagnetic waves of the frequency to which the resonant receiving circuit of station 2 is attuned and it will be found, if the constants of the foregoing table are employed, that the entire system at station 2 consisting of the elevated conductor, parallel-branch circuit and earth connector, has for said frequency a pronounced rate of vibration, that for said frequency the earth connector of station 2 has a high impedance and that the currents in the parallel-branch circuit of said station are not equal in amplitude. The oscillations therefore which are developed in the system at station 2 by waves radiated from the system at station 1, create currents of relatively large amplitude in the resonant receiving circuit of station 2 and operate the oscillation detector which may be associated with said circuit in any of the usual ways. Conversely the oscillations impressed upon the elevated conductor system of station 2 by its oscillation producing circuit will not affect the resonant receiving circuit at said station, and will cause the radiation of electromagnetic waves which produce in the system at station 1 oscillations of a frequency corresponding to one of the pronounced rates of vibration of said system and to which the resonant receiving circuit of station 1 is attuned. For a more complete explanation of the facts above enumerated attention is called to the patent to Stone No. 884,107, April 7, 1908, especially Fig. 7 thereof, and the patent to Stone No. 884,109, April 7, 1908, especially Fig. 5 thereof.

Figure 6:
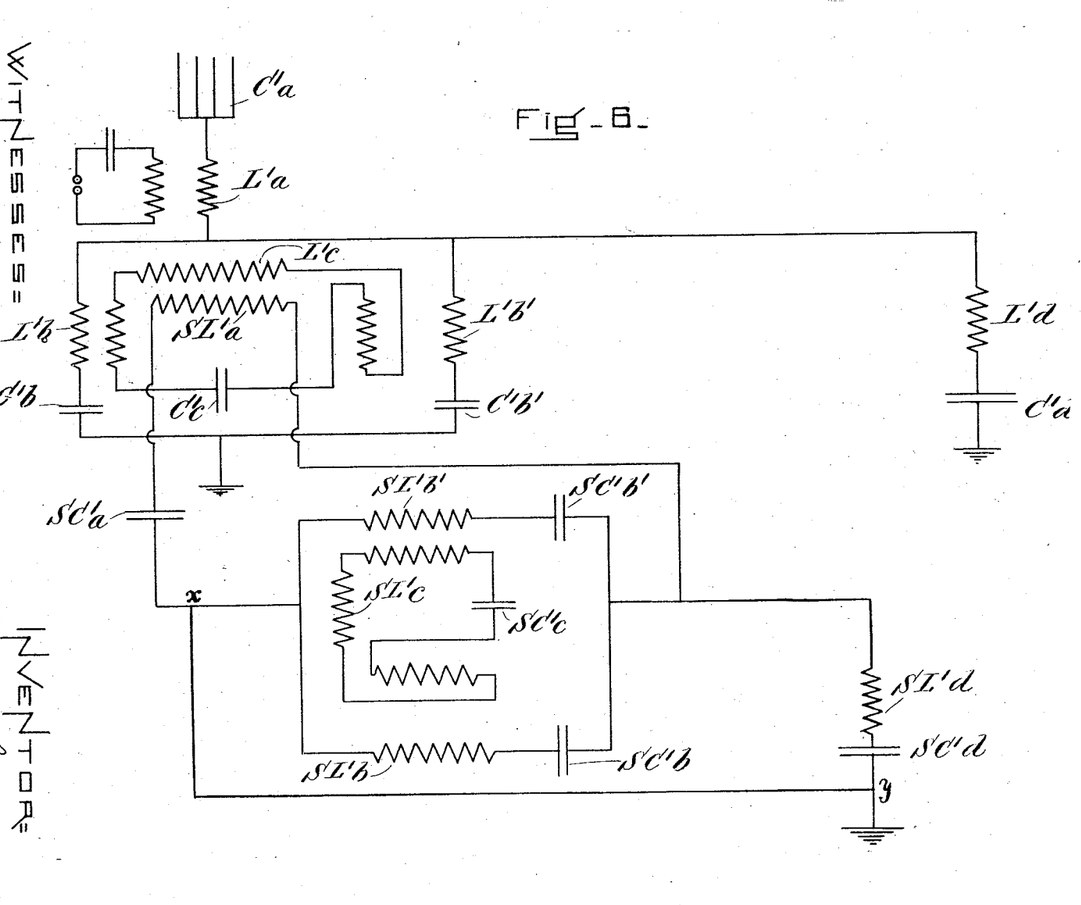
Figs. 6, 7, 8 and 9 show modifications of the systems illustrated in Figs. 3, 4 and 5.

In the modification illustrated in Fig. 6 I have shown means for obtaining additional protection for the home resonant receiving circuit, consisting in the interposition between said resonant receiving circuit and the parallel-branch circuit $L'b$ $C'b$ $L'b'C'b'$ of a second circuit consisting of the coil $SL'a$ and the condenser $SC'a$ connected in series with a second parallel-branch circuit having in one branch the coil $SL'b'$ and the condenser $SC'b'$ and in the other branch the coil $SL'b$ and the condenser $SC'b$. In this case the resonant circuit $L'c$ $C'c$ is attuned to the frequency of the waves radiated from the distant transmitting station and the above mentioned second circuit is so arranged that one of its most pronounced rates of vibration is equal to that of the frequency to which said resonant circuit is attuned, such arrangement having been fully described in the patent to Stone No. 884,106, April 7, 1908. The resonant receiving circuit $SL'c$ $SC'c$ is attuned to the frequency of the waves developed at the distant transmitting station. A second earth connector $SL'd$ $SC'd$, attuned to the same frequency as the earth connector $L'd$ $C'd$ and the elevated conductor $C'a$ $L'a$, may be employed to connect one side of the second circuit to earth and a conductor $xy$ may connect the other side of said second circuit to earth.

Figure 7:
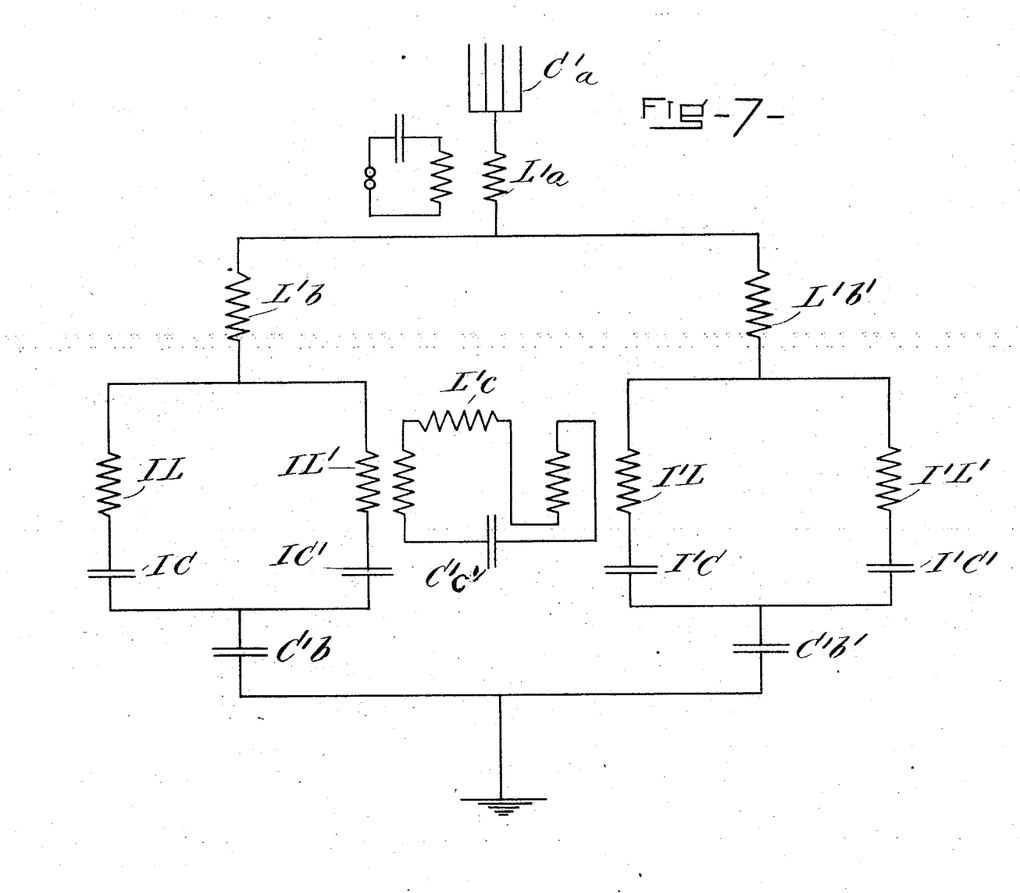

Fig. 7 shows a further modification in which I make use of the principle set forth in the patent to Stone 884,106, April 7, 1908, and the patent to Cram 884,076, April 7, 1908, that a parallel-branch circuit containing capacity in one branch and inductance in the other, is the equivalent of a capacity or of an inductance according to the frequency of the forces acting on the circuit. In the present instance, comparing Fig. 7 with Fig. 5, it will be seen that I have inserted in one branch of the parallel-branch circuit a second parallel-branch circuit $IL$ $IC$ $IL'$ $IC'$ and in the other branch another parallel-branch circuit $I'L$ $I'C$ $I'L'$ $L'C'$. In the system shown in Fig. 7, as in that shown in Fig. 5, the oscillations impressed on the system by the home oscillation producing circuit are neutralized with respect to the resonant receiving circuit L′c C′c.

Figure 8:
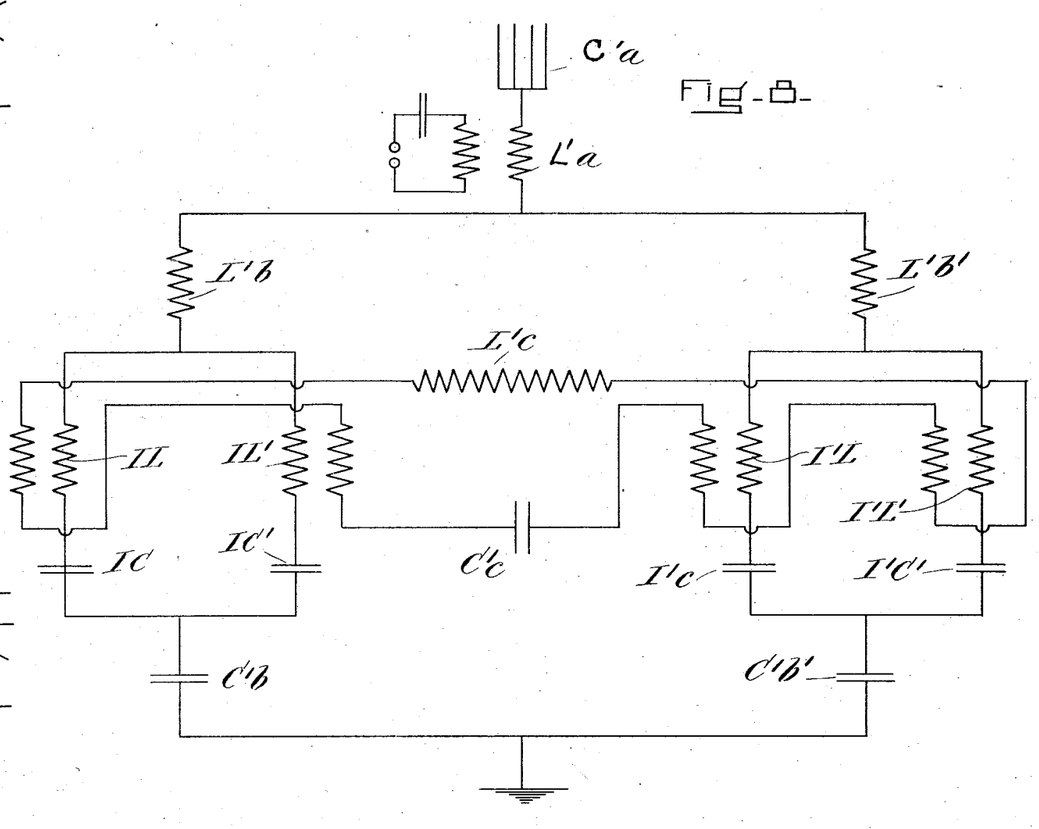

Inasmuch as it is possible to so arrange matters that the currents in the coils IL IL′ I′L and I′L′ are pair by pair opposite in phase, the resonant receiving circuit L′c C′c may be associated with all of said coils in the manner shown in Fig. 8. In this case the amplitude of the currents developed in the resonant receiving circuit by an electromotive force of the frequency to which said circuit is attuned will be greater other things being equal than in the case illustrated in Fig. 7 because for forces of the frequency to which said circuit is attuned the currents in said coils are not opposite in phase.

Figure 9:
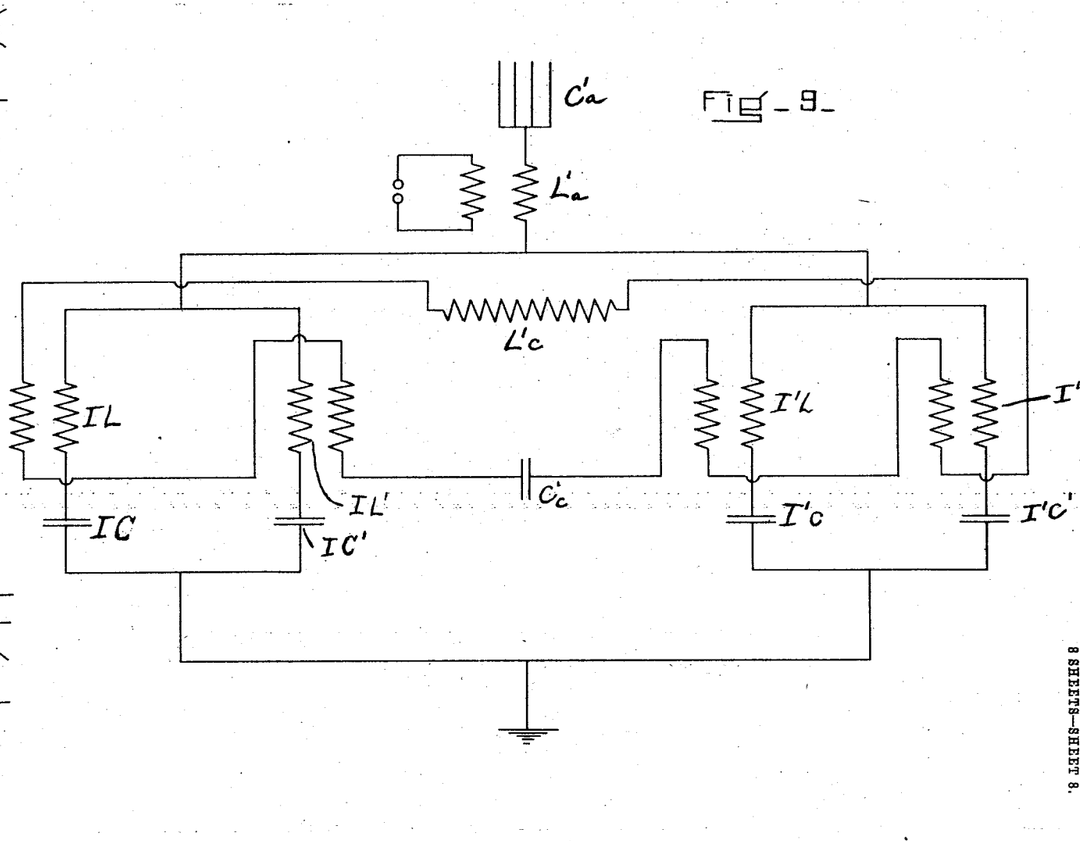

Inasmuch as a parallel-branch circuit having capacity in one branch and inductance in the other may be made to have a capacity reactance or an inductance reactance depending upon the frequency employed, as more fully explained in the patent to Stone 884,106, April 7, 1908, above referred to, in connection with Fig. 6 thereof, I may eliminate the serially connected coils and condensers L′b L′b′ C′b C′b′ of Fig. 8 and thereby arrive at the system of circuits shown in Fig. 9, in which the operation is the same as that above set forth in connection with Fig. 8.

One of the chief advantages of the system herein described is that thereby a receiving operator may cut in upon the transmission from a distant station when he fails to understand a portion of a message. This he does merely by depressing his transmitting key and signaling "Bk.", ("break") whereupon the distant transmitting operator who sends with his head telephone in position and who receives by such telephone the "break" signal between his own signal elements ceases to send and receives from the other operator instructions for repeating that portion of the original message which was not understood.

I claim:

1. In a space telegraph system, an elevated conductor, a parallel-branch circuit connected in series therewith and containing capacity and inductance in each of its branches, a resonant receiving circuit associated with both branches of said parallel-branch circuit and an oscillation-producing circuit associated with said elevated conductor, the said resonant receiving circuit having a very high impedance for oscillations of the frequency generated by said oscillation-producing circuit and the system comprising said elevated conductor and parallel-branch circuit having a very low impedance for oscillations of the frequency to which said resonant receiving circuit is attuned.

2. In a space telegraph system, an elevated conductor, a parallel-branch circuit connected in series therewith and containing capacity and inductance in each of its branches, a resonant receiving circuit associated with both branches of said parallel-branch circuit, an oscillation-producing circuit associated with said elevated conductor, the said resonant receiving circuit having a very high impedance for oscillations of the frequency generated by said oscillation-producing circuit and the system comprising said elevated conductor and parallel-branch circuit having a very low impedance for oscillations of the frequency to which said resonant receiving circuit is attuned; and an earth connector in series with said elevated conductor and in parallel with said parallel-branch circuit, said earth connector having practically zero impedance for the fundamental frequency of said elevated conductor.

3. In a space telegraph system, an elevated conductor, a parallel-branch circuit connected in series therewith and containing capacity and inductance in each of its branches, a resonant receiving circuit associated with both branches of said parallel branch circuit and an oscillation-producing circuit associated with said elevated conductor, said parallel-branch circuit having a very high impedance for oscillations of the frequency generated by said oscillation-producing circuit and the system comprising said elevated conductor and parallel-branch circuit having a very low impedance for oscillations of the frequency to which said resonant receiving circuit is attuned.

4. In a space telegraph system, an elevated conductor, a parallel-branch circuit connected in series therewith and containing capacity and inductance in each of its branches, a resonant receiving circuit associated with both branches of said parallel-branch circuit, an oscillation-producing circuit associated with said elevated conductor, said parallel-branch circuit having a very high impedance for oscillations of the frequency generated by said oscillation-producing circuit and the system comprising said elevated conductor and parallel-branch circuit having a very low impedance for oscillations of the frequency to which said resonant receiving circuit is attuned; and an earth connector in series with said elevated conductor and in parallel with said parallel-branch circuit, said earth connector having practically zero impedance for the fundamental frequency of said elevated conductor.

In testimony whereof, I have hereunto subscribed my name this 7th day of June 1907.

OSCAR C. ROOS.

Witnesses:
CHARLES C. KURTZ,
GEO. K. WOODWORTH.